United States Patent
Kupitman et al.

(10) Patent No.: US 10,817,407 B2
(45) Date of Patent: Oct. 27, 2020

(54) POC PLATFORM WHICH COMPARES STARTUP S/W PRODUCTS INCLUDING EVALUATING THEIR MACHINE LEARNING MODELS

(71) Applicant: Proov Systems Ltd, Herzliya (IL)

(72) Inventors: Yury Kupitman, Ganei Tiqwa (IL); Alexey Sapozhnikov, Ramat Gan (IL); Toby Olshanetsky, Herzliya (IL)

(73) Assignee: PROOV SYSTEMS LTD., Herzliya (IL)

( * ) Notice: Subject to any disclaimer, the term of this patent is extended or adjusted under 35 U.S.C. 154(b) by 0 days.

(21) Appl. No.: 16/405,022

(22) Filed: May 7, 2019

(65) Prior Publication Data

US 2019/0340110 A1    Nov. 7, 2019

Related U.S. Application Data

(60) Provisional application No. 62/667,630, filed on May 7, 2018, provisional application No. 62/667,631, filed on May 7, 2018.

(51) Int. Cl.
| | | |
|---|---|---|
| *G06F 9/44* | (2018.01) | |
| *G06F 11/36* | (2006.01) | |
| *G06N 20/00* | (2019.01) | |
| *G06F 8/20* | (2018.01) | |
| *G06F 11/34* | (2006.01) | |
| *H04L 12/26* | (2006.01) | |

(52) U.S. Cl.
CPC ............ *G06F 11/3664* (2013.01); *G06F 8/20* (2013.01); *G06F 11/3457* (2013.01); *G06F 11/3608* (2013.01); *G06F 11/3668* (2013.01); *G06N 20/00* (2019.01); *H04L 43/50* (2013.01)

(58) Field of Classification Search
CPC ............ G06F 11/3664; G06F 11/3457; G06F 11/3608; G06F 11/3668; G06F 8/20; G06N 20/00; H04L 43/50
See application file for complete search history.

(56) References Cited

U.S. PATENT DOCUMENTS

| | | |
|---|---|---|
| 5,644,694 A | 7/1997 | Appleton |
| 5,729,669 A | 3/1998 | Appleton |
| (Continued) | | |

FOREIGN PATENT DOCUMENTS

WO    2008/134453 A1    11/2008

OTHER PUBLICATIONS

"Application Layer Intrustion Dectection", Sep. 7, 2015.
(Continued)

*Primary Examiner* — Chat C Do
*Assistant Examiner* — Lenin Paulino
(74) *Attorney, Agent, or Firm* — Browdy and Neimark, PLLC

(57) ABSTRACT

A proof-of-concept (PoC) method comprising: on a networked platform, serving a population of enterprise endusers and a population of ISV end-users, on which PoCs are run, providing a PoC-defining user interface via which at least one enterprise end-user generates a definition of at least one PoC; and using a processor to automatically assess whether an individual machine learning model embodied in a body of code of an individual software product registered for an individual PoC, is suitable for the individual PoC as defined by the definition.

11 Claims, 3 Drawing Sheets

Operation 5. for each supported category of ML models, the system e.g. PoC platform pre-stores test dataset/s (typically per industry or category e.g. financial, medical, etc.); and/or snippet/s of ML-model quality evaluation code
↓
Operation 10. Enterprise may request to evaluate accuracy and/or efficiency of AI Model/s provided by startup/s participating in a given pilot
↓
Operation 25. Upon joining a PoC, each startup/ISV receives from platform a "request", or is prompted, to give the platform access to its AI Model e.g. by uploading the Model and/or its weights.
↓
Operation 40. PoC platform identifies the structure of the Model e.g. applying code reflection techniques to code text of the model uploaded by the startup
↓
Operation 50. PoC platform identifies the ML-model category to which the Model belongs
↓
Operation 60. PoC platform selects test dataset/s and code snippet/s, from among those pre-stored in Operation 5, based on the category identified in operation 50.
↓
Operation 70. PoC platform evaluates each Model of each startup participating in the specific pilot, by applying the snippet's selected in operation 60, on every test dataset in the group selected in operation 60
↓
Operation 80. PoC platform measures efficiency of model and/or of software product implementing the Model in terms of KPI (aka ML metrics), thereby to facilitate comparison between models.

(56) References Cited

U.S. PATENT DOCUMENTS

| | | | |
|---|---|---|---|
| 7,509,626 | B1 | 3/2009 | Barnes et al. |
| 7,620,933 | B1 | 11/2009 | Appleton |
| 8,694,953 | B2 | 4/2014 | Khodabandehloo et al. |
| 9,329,915 | B1 | 5/2016 | Chandrasekharapuram et al. |
| 10,140,206 | B2 | 11/2018 | Sapozhnikov et al. |
| 10,348,578 | B2 | 7/2019 | Sapozhnikov et al. |
| 2004/0111428 | A1 | 6/2004 | Rajan et al. |
| 2010/0274800 | A1 | 10/2010 | Bogeby et al. |
| 2013/0288736 | A1 | 10/2013 | Laumen et al. |
| 2014/0365198 | A1 | 12/2014 | Kuell et al. |
| 2017/0139816 | A1 | 5/2017 | Sapozhnkov et al. |
| 2018/0053134 | A1 | 2/2018 | Olshanetsky et al. |
| 2019/0050321 | A1 | 2/2019 | Sapozhnikov et al. |
| 2019/0102682 | A1* | 4/2019 | Jayaraman ............ G06F 16/285 |
| 2019/0102700 | A1* | 4/2019 | Babu ................. G06N 5/025 |
| 2019/0114251 | A1 | 4/2019 | Sapozhnikov et al. |

OTHER PUBLICATIONS

"Apache Commons Math" Oct. 29, 2015.
"Apache Drill", Oct. 23, 2015.
"Sparkling Water provides H2) funcitionality inside Spark cluster" Aug. 10, 2015.
"Apache Flink", Oct. 15, 2015.
"MapReduce", Oct. 25, 2015.
PCAP definition on Wikipedia (Mar. 2018).
What is PCAP? (Apr. 2018).
How to Monitor Machine Learning Models in Real-Time (Jan. 2019).
6 Supervised machine learning models on the given dataset (Oct. 2017).
Metrics to Evaluate Machine Learning Algorithms in Python (Aug. 2018).
Methods for saving and loading Keras Deep Learning Models (Jul. 2017).
Training, validation, and test sets definition on Wikipedia (Dec. 2018).
Choosing the right estimator (Dec. 2018).
Examples to available datasets websites: Data catalog (Apr. 2018).
NYC open data (Jul. 2018).
Kaggle datasets (Jul. 2018).
A part of an example Python code snippet, operative to measure ROC AUC (Nov. 2018).
"N-gram", Mar. 1, 2020.
"Textgenrnn".
"Beginners guide to text generation using LSTMs".
Xie, Z. (2017). Neural text generation: A practical guide. arXiv preprint arXiv:1711.09534.
Surendra, H., & Mohan, H. S. (2017). A review of synthetic data generation methods for privacy preserving data publishing. Int J Sci Technol Res, 6(3), 95-101.
Luo, B., Feng, Y., Wang, Z., Huang, S., Yan, R., & Zhao, D. (2018). Marrying up regular expressions with neural networks: A case study for spoken language understanding. arXiv preprint arXiv:1805.05588.
"Bag of Words", Feb. 26, 2020.
"Machine Learning".
"Apache POI", Feb. 2020.
"Analyzing Sentence Structure", Sep. 4, 2019.
"Sentence Detector".
"English Tree Tagger . . . ".
"KDnuggets", Jan. 2015.
"Proov".
"MapReduce", available online at en.wikipedia.org/w/index.php?title=MapReduce&oldid=687813284, Oct. 25, 2015.
PCAP definition on Wikipedia (Mar. 2018): available online at en.wikipedia.org/w/index.php?title=Pcap&oldid=830802604.
What is PCAP? (Apr. 2018): available online at web.archive.org/web/20180415041237/http://www.tech-faq.com/pcap.html.
How to Monitor Machine Learning Models in Real-Time (Jan. 2019): available online at www.kdnuggets.com/2019/01/monitor-machine-learning-real-time.htML.
6 Supervised machine learning models on the given dataset (Oct. 2017): available online at www.kaggle.com/nirajvermafcb/comparing-various-ml-models-roc-curve-comparison.
Metrics To Evaluate Machine Learning Algorithms in Python (Aug. 2018): available online at web.archive.org/web/20180826095232/https://machinelearningmastery.com/metrics-evaluate-machine-learning-algorithms-python/.
Methods for saving and loading Keras Deep Learning Models (Jul. 2017): available online at web.archive.org/web/20170711040859/https://machinelearningmastery.com/save-load-keras-deep-learning-models/.
Training, validation, and test sets definition on Wikipedia (Dec. 2018): available online at en.wikipedia.org/w/index.php?title=Training,_validation_and_test_sets&oldid=875589895.
Choosing the right estimator (Dec. 2018): available online at web.archive.org/web/20181231235826/https://scikit-learn.org/stable/tutorial/machine_learning_map/index.html.
Examples to available datasets websites: Data catalog (Apr. 2018): available online at web.archive.org/web/20180428055928/https://catalog.data.gov/dataset.
NYC open data (Jul. 2018): available online at web.archive.org/web/20180730220430/https://opendata.cityofnewyork.us/data/.
Kaggle datasets (Jul. 2018): available online at web.archive.org/web/20180730023626/http://www.kaggle.com/datasets.
A part of An example Python code snippet, operative to measure ROC AUC (Nov. 2018): available online at web.archive.org/web/20181130112834/https://raw.githubusercontent.com/jbrownlee/Datasets/master/pima-indians-diabetes.data.csv.
Song, Y., Zhang, L., & Giles, C. L. (2011). Automatic tag recommendation algorithms for social recommender systems. ACM Transactions on the Web (TWEB), 5(1), 4.
"n-gram", available online at en.wikipedia.org/wiki/N-gram, Mar. 1, 2020.
"textgenrnn", available online at github.com/minimaxir/textgenmn.
"Beginners guide to text generation using LSTMs" available online at www.kaggle.com/shivamb/beginners-guide-to-text-generation-using-lstms, 2019.
Xie, Z. (2017). Neural text generation: A practical guide. arXiv preprint arXiv:1711.09534 Available online at cs.stanford.edu/~zxie/textgen.pdf, Mar. 22, 2018.
Surendra, H., & Mohan, H. S. (2017). A review of synthetic data generation methods for privacy preserving data publishing. Int J Sci Technol Res, 6(3), 95-101; Available online at www.ijstr.org/final-print/mar2017/A-Review-Of-Synthetic-Data-Generation-Methods-For-Privacy-Preserving-Data-Publishing.pdf. —Mar. 3, 2017.
Luo, B., Feng, Y., Wang, Z., Huang, S., Yan, R., & Zhao, D. (2018). Marrying up regular expressions with neural networks: A case study for spoken language understanding. arXiv preprint arXiv:1805.05588 Available online at www.aclweb.org/anthology/P18-11941, Jul. 2018.
"Bag of Words", available online at en.wikipedia.org/wiki/Bag-of-words_model, Feb. 26, 2020.
"Machine Learning", available online at opennlp.apache.org/docs/1.9.1/manual/opennlp.html#opennlp.ml.maxent.
"Apache POI", available online at poi.apache.org/, Feb. 2020.
"Analyzing Sentence Structure", available online at www.nltk.org/book/ch08.html, Sep. 4, 2019.
"Sentence Detector", available online at opennlp.apache.org/docs/1.9.2/manual/opennlp.html#tools.sentdetect.
"English Tree Tagger . . . ", available online at www.sketchengine.eu/english-treetagger-pipeline-2/.
"KDnuggets", available online at www.kdnuggets.com/2015/01/text-analysis-101-document-classification.html, Jan. 2015.
"Proov", available online at proov.io, downloaded on Aug. 6, 2020.

* cited by examiner

FIG. 1

Operation 5. for each supported category of ML models, the system e.g. PoC platform pre-stores test dataset/s (typically per industry or category e.g. financial, medical, etc.); and/or snippet/s of ML-model quality evaluation code

Operation 10. Enterprise may request to evaluate accuracy and/or efficiency of AI Model/s provided by startup/s participating in a given pilot

Operation 25. Upon joining a PoC, each startup/ISV receives from platform a "request", or is prompted, to give the platform access to its AI Model e.g. by uploading the Model and/or its weights.

Operation 40. PoC platform identifies the structure of the Model e.g. applying code reflection techniques to code text of the model uploaded by the startup

Operation 50. PoC platform identifies the ML-model category to which the Model belongs

Operation 60. PoC platform selects test dataset/s and code snippet/s, from among those pre-stored in Operation 5, based on the category identified in operation 50.

Operation 70. PoC platform evaluates each Model of each startup participating in the specific pilot, by applying the snippet's selected in operation 60, on every test dataset in the group selected in operation 60

Operation 80. PoC platform measures efficiency of model and/or of software product implementing the Model in terms of KPI (aka ML metrics), thereby to facilitate comparison between models.

FIG. 2

100. Using the PoC-defining user interface, aka PoC wizard, the Enterprise may be prompted to tag the PoC

↓

200. An ISV which has joined the PoC, uploads its model files.

↓

220 The platform's server tries to load and read the uploaded file using any one of whichever Deep learning Libraries/Frameworks are supported by the PoC platform.

↓

230 Assuming success in reading the uploaded file mode, the platform server may identify the model category/structure (e.g. number of layers in the model)

↓

240. If the model as identified by the framework's tools is not any of the model categories selected above as being suitable for this PoC, provide an output indication

↓

250. Run test datasets on the model and compute KPIs relevant to model category identified by framework's tools and/or KPIs suitable for model category/ies known to be suitable for the PoC.

↓

300. Repeat operations 200, 220, 230, 240, 250 for each ISV that joins the PoC.

US 10,817,407 B2

POC PLATFORM WHICH COMPARES STARTUP S/W PRODUCTS INCLUDING EVALUATING THEIR MACHINE LEARNING MODELS

REFERENCE TO CO-PENDING APPLICATIONS

Priority is claimed from U.S. provisional application No. 62/667,631, entitled " . . . Enhanced Production Environment Behavior Mirroring e.g. while Conducting Pilot On Proof-Of-Concept Platform", and from U.S. provisional application No. 62/667,630 entitled "POC Platform Which Compares Startup Models", both filed 7 May 2018, the disclosures of which applications are hereby incorporated herein by reference.

FIELD OF THIS DISCLOSURE

The present invention relates generally to software and more particularly to proof-of-concept (PoC), i.e. pilot testing, of software.

BACKGROUND FOR THIS DISCLOSURE

Machine model comparison technologies are described e.g. here:
www.kdnuggets.com/2019/01/monitor-machine-learning-real-time.htML (dated 2019);
and here:
www.kaggle.com/nirajvermafcb/comparing-various-ML-models-roc-curve-comparison and
machinelearningmastery.com/metrics-evaluate-machine-learning-algorithms-python/

Keras is an example of a Python library for deep learning. Methods for saving and loading Keras Deep Learning Models are described here:
machinelearningmastery.com/save-load-keras-deep-learning-models/.

Conventional PoC platforms are described e.g. in the following publications:

U.S. Ser. No. 15/347,191 filed Sep. 11, 2016, publication number US 2017/0139816, describes a computerized method and end-to-end "Pilot as a Service" system for controlling start-up/enterprise interactions" including an end-to-end "pilot as service" system for software pilot testing, comprising a server including at least one processor and operative for generating a set of software testing environment/s simultaneously serving plural clients from among a first plurality of enterprise clients, the environment being operative for concurrently running plural proof-of-concept tests for respective plural software products each being tested ("pilots"), on behalf of an individual start-up client from among a second plurality of start-up clients, by an individual one of the population of enterprise clients; a registration functionality, on the processor, operative for pre-registering at least one of: enterprise clients from among the first plurality of enterprise clients, and start-up clients from among the second plurality of start-up clients; and a dashboard functionality, on the processor, operative for presenting at least one result of at least one proof-of-concept test to each client which has pre-registered.

U.S. Ser. No. 15/586,575 filed Apr. 5, 2017, publication number US-2018-0053134 describes a "System, method and computer product for management of proof-of-concept software pilots, including neural network-based KPI prediction" including a computerized computer software pilot evaluation method for quantifying performance of a first population of start-up end-users, each start-up end-user contending within at least one software pilot defined by, including performing a software task for, an enterprise end-user from among a second population of enterprise end-users, the method comprising: generating at least one neural network model, using a processor, for at least one startup server participating in at least one enterprise's pilot (aka computer software pilot), the computer software pilot comprising a task to be performed by each of at least one startup server participating in the pilot, and using the at least one neural network model to predict at least one derivable KPI from measurable KPIs generated by the startup server within the enterprise's pilot.

A software proof-of-concept platform, including simulation of product behavior and/or data is described in US Patent Publication 20190114251, including a system comprising a platform configured for communicating with enterprise end-users and for allowing the enterprise end-users to perform proof-of-concept testing for startups which provide respective enterprises with software products to be evaluated by the respective enterprises, the platform including processor functionality configured to analyze available information on enterprise data and, accordingly, generate metadata characterizing the enterprise data; generate artificial enterprise data conforming to the metadata; analyze available information on enterprise APIs and, accordingly, generate metadata characterizing the enterprise APIs; and generate at least one artificial API conforming to that metadata.

A computerized method and end-to-end "Pilot as a Service" system for controlling start-up/enterprise interactions is described in US patent Publication number: 20190050321, including an end-to-end "pilot as service" system for software pilot testing, comprising a server including at least one processor and operative for generating a set of software testing environment/s simultaneously serving plural clients from among a first plurality of enterprise clients, the environment being operative for concurrently running plural proof-of-concept tests for respective plural software products each being tested ("pilots"), on behalf of an individual start-up client from among a second plurality of start-up clients, by an individual one of the population of enterprise clients; a registration functionality, on the processor, operative for pre-registering at least one of: enterprise clients from among the first plurality of enterprise clients, and start-up clients from among the second plurality of start-up clients; and a dashboard functionality, on the processor, operative for presenting at least one result of at least one proof-of-concept test to each client which has pre-registered.

A computerized method and end-to-end "pilot as a service" system for controlling start-up/enterprise interactions is described in U.S. publication patent Ser. No. 10/140,206 including an end-to-end "pilot as service" system for software pilot testing, comprising a server including at least one processor and operative for generating a set of software testing environment/s simultaneously serving plural clients from among a first plurality of enterprise clients, the environment being operative for concurrently running plural proof-of-concept tests for respective plural software products each being tested ("pilots"), on behalf of an individual start-up client from among a second plurality of start-up clients, by an individual one of the population of enterprise clients; a registration functionality, on the processor, operative for pre-registering at least one of: enterprise clients from among the first plurality of enterprise clients, and start-up clients from among the second plurality of start-up clients; and a dashboard functionality, on the processor, operative for presenting at least one result of at least one proof-of-concept test to each client which has pre-registered.

It is known in the art that for problems suffering from class imbalance, using an evaluation metric of Precision-Recall area under curve (PR AUC) is better than Receiver-Operating-Characteristic AUC (ROC AUC). A large change in the number of false positives can lead to a small change in the false positive rate used in ROC analysis. Precision, on the other hand, by comparing false positives to true positives, rather than true negatives, captures the effect of the large number of negative examples on the algorithm's performance.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments allow software solutions embodying or incorporating ML (machine learning) models, to be compared efficiently both on the basis of their performance as software (e.g. "demands" in terms of memory and/or CPU) and on the basis of their performance as ML models (e.g. as measured by ML KPIs (aka metrics) described herein).

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented, as appropriate.

The present invention typically includes at least the following embodiments:

Embodiment 1

A proof-of-concept (PoC) system comprising:
a networked platform, serving a population of enterprise end-users and a population of ISV end-users, on which PoCs are run, the platform including
  a PoC-defining user interface via which at least one enterprise end-user generates a definition of at least one PoC; and
  a processor including logic configured to automatically assess whether an individual machine learning model embodied in a body of code of an individual software product registered for an individual PoC is suitable for the individual PoC as defined by said definition.

Embodiment 2

A system according to any of the preceding embodiments wherein the system includes a memory and wherein tags define at least one PoC and wherein at least some of the tags are associated in said memory with a respective set of models including at least one category of model and wherein the processor determines the category of said individual model and then assesses that the individual model is suitable for the individual PoC if the category of said individual model is included in said set of models.

Embodiment 3

A system according to any of the preceding embodiments wherein said tags are selected, by the enterprise end-user via the PoC-defining user interface, from a plurality of tags stored in said memory and presented to the enterprise end-user.

Embodiment 4

A system according to any of the preceding embodiments wherein the system also comprises an ISV user interface via which at least one ISV end-user registers at least one software product for at least one PoC defined by at least one enterprise end-user; and wherein the user interface prompts an individual ISV end-user to generate a definition of the individual machine learning model embodied in the individual software product registered for the individual PoC by the individual ISV end-user, wherein the individual machine learning model is of category t and wherein the processor derives said category t from said definition and assesses that the individual model is suitable for the individual PoC if category t is included in said set of models.

Embodiment 5

A system according to any of the preceding embodiments wherein for at least one PoC for which at least one software product has registered, a KPI is computed which represents the software product's extent of usage of at least one of memory and CPU.

Embodiment 6

A system according to any of the preceding embodiments wherein for software products with different categories of ML models, the platform computes different ML model quality KPIs respectively, using stored data indicating ML KPIs which are suitable for each of plural categories of ML models.

Embodiment 7

A system according to any of the preceding embodiments wherein said ML model quality KPIs are computed by code snippets that are stored by the platform and wherein at least one of said code snippets is re-used plural times, to compute model quality for each of m>1 models participating in each of p>1 PoCs.

Embodiment 8

A system according to any of the preceding embodiments wherein the platform stores datasets suitable for a certain category of models which are re-run on each of m>1 models of said category participating in each of p>1 PoCs.

Embodiment 9

A system according to any of the preceding embodiments wherein the platform stores dictionaries of instances of semantic categories and uses said dictionaries to identify table columns in newly arrived datasets.

For example, if many of the entries in new table t's column c appear in the platform's symptom dictionary, and only a few or none of the entries in column c appear in the platform's other dictionaries such as the platform's country dictionary which lists many countries, the platform's language dictionary which lists many languages, and the country's medications dictionary which lists many medications, then column c may be labelled "symptoms". Similarly, 2 other columns in table c may be labelled "dosage" and "medication" and the 3 columns in question may then be used as datasets on which to run PoCs which pertain to relationships between medication, dosage and symptoms.

Embodiment 10

A system according to any of the preceding embodiments wherein the PoC-defining user interface provides at least one enterprise end-user with a hierarchical menu having at least one layer, and wherein the enterprise end-user classifies the PoC according to a taxonomy underlying the hierarchical menu and wherein the same taxonomy is used to add dataset metadata to each of said datasets, said dataset metadata classifying each of said datasets according to said taxonomy.

Embodiment 11

A system according to any of the preceding embodiments wherein the same taxonomy is used to add dictionary metadata to each of said dictionaries, said dictionary metadata classifying each of said dictionaries according to said taxonomy.

Embodiment 12

A proof-of-concept (PoC) method comprising:
on a networked platform, serving a population of enterprise end-users and a population of ISV end-users, on which PoCs are run,
providing a PoC-defining user interface via which at least one enterprise end-user generates a definition of at least one PoC; and
using a processor to automatically assess whether an individual machine learning model embodied in a body of code of an individual software product registered for an individual PoC, is suitable for the individual PoC as defined by said definition.

The present invention also typically includes the following embodiments:

Embodiment a1

A system or method for comparing plural machine learning models or classification models all typically operating on a given category of data such as, say, images of dogs, or of certain body parts, or certain categories of financial forms, and all typically performing the same machine learning task, such as, say, grouping images of dogs based on, say, the dogs' breed.

Embodiment a2

A proof-of-concept platform facilitating participation of startups in enterprise-associated pilots and including a model-evaluation option allowing at least some enterprises to compare models entered by respective startups in a given pilot.

Embodiment a3

A platform according to Embodiment a2 wherein said model-evaluation option invokes the system or method of Embodiment a1.

Embodiment a4

An apparatus or process according to any preceding embodiment and including a user interface via which a startup uploads at least one characteristic of the startup's model such as the model's weights.

Embodiment a5

An apparatus or process according to any preceding embodiment which is operative to discern at least one characteristic of at least one model (such as structure thereof or category thereof) automatically, thereby to take into account that a startup may deceive an enterprise as to at least one characteristic of his model such as whether a model exists in the startup's software product at all.

Embodiment a6

An apparatus or process according to any preceding embodiment wherein at least one dataset is pre-defined for at least one category of model.

Embodiment a7

A platform according to any preceding embodiment wherein the output comprises, for each of plural startups, uniform (over all startups in the pilot) KPIs describing efficiency of each startup's software product and also uniform (over all startups in the pilot) machine learning aka ML metrics describing each startup's software product's model, thereby to enable startups to be easily compared.

Embodiment a8

A platform according to any preceding embodiment wherein ML metrics includes at least one of or all or any subset of:
confusion matrix
precision/recall, f-score
pr auc
roc auc—
sensitivity to unbalanced classes Embodiment a9

A system or method according to any preceding embodiment for comparing plural machine learning models wherein all the models are performing a single machine learning task defined by a given pilot defined within a proof-of-concept system.

Embodiment a10

A system or method according to any preceding embodiment for comparing plural regression models wherein comparison of the models comprises providing values, for each model, for at least one of the following metrics:
Pearson correlation coefficient (Pcc)
r-squared
standard deviation, mean, median of errors (related to input datasets)
sensitivity to noise (related to input datasets)
sensitivity to outliers (related to input datasets)
sensitivity to time gaps,
thereby to facilitate comparison between models.

Embodiment a11

An apparatus or process according to any preceding embodiment wherein the categories include at least one of:

knowledge-based classification (inductive learning, deductive learning), feedback-based classification (supervised learning, unsupervised learning, semi-supervised learning, reinforcement learning).

Embodiment a12

Processing circuitry comprising at least one processor and at least one memory and configured to perform at least one of or any combination of the described operations, or to execute any combination of the described modules.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or a combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in the singular form is not intended to be limiting; thus the term processor is intended to include a plurality of processing units which may be distributed or remote, the term server is intended to include plural, typically interconnected modules, running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

The following terms may be construed either in accordance with any definition thereof appearing in the prior art literature, or in accordance with the specification, or to include in their respective scopes, the following:

Model—intended to include a machine learning model such as a neural network, or a machine learning model, or a regression model, or a classification model. Typically the model comprises a processor or computational circuitry or logic which is configured to input a stream of data and to output, for each data element in the stream, a classification of that data element into a given class, or a value that may be assigned to or stored or output in conjunction with, the input data element. Amazon ML for example supports three categories of ML models: binary classification, multiclass classification, and regression. The first predicts a binary outcome e.g. one of two possible classes to which a given data element belongs. To train binary classification models, Amazon ML uses a learning algorithm known as logistic regression but this is not intended to be limiting. The second predicts one of n>2 possible classes to which a given data element belongs. To train multiclass models, Amazon ML uses multinomial logistic regression however, again, other learning algorithms are possible. The third category of model, for regression, typically predicts a numeric value for each data element.

Dataset—intended to include a collection of data which may be stored in any sort of digital storage or computer memory, or may be received via any sort of API or interface, on the fly.

Test dataset—intended to include a dataset used to evaluate a model e.g. the "test set" described in:
en.wikipedia.org/wiki/Training,validation, and test sets.

ISV=intended to include an Independent Software Vendor end-user of a PoC platform which provides a software product (which typically performs, or is said to perform, machine learning) for evaluation on the PoC platform, typically in the framework of a pilot being run by a given enterprise end-user of the PoC platform.

Receiver operating characteristic curve, i.e. ROC curve, intended to include a graphical plot that illustrates the diagnostic ability of a binary classifier system as its discrimination threshold is varied. The ROC curve is created by plotting the true positive rate (TPR) against the false positive rate (FPR) at various threshold settings.

The area under the ROC curve may be interpreted as the probability that a randomly selected one of those members, classified as positive, is assigned a higher score than a randomly selected one of those members, classified as negative.

Code snippet: intended to include re-usable source code, machine code, or text which may comprise a formally defined operative unit which is then incorporated, plural times, into larger programming module/s, or a larger body of code.

"category" or "machine learning model category": intended to include categories of learning algorithms which may or may not be mutually exclusive e.g. all or any subset of: Knowledge-based Classification or any subcategory therewithin e.g. Inductive Learning, Deductive Learning; Feedback-based Classification or any sub-category therewithin e.g. Supervised Learning, Unsupervised Learning, Semi-Supervised Learning, Reinforcement Learning, probabilistic classification; observational classification, Support Vector Machine, linear regression, logistic regression, naive Bayes, linear discriminant analysis, decision tree, k-nearest neighbor algorithm, Neural Network or Multilayer perceptron, Similarity Learning.

Example: Classification models, categorization models and neural networks, etc. are three possible examples of model "categories" (which are not necessarily mutually exclusive). KNN and SVM are two examples of models which may be members of the classification model category, whereas squeezenet, resnet, inceptionv3 and densenet are four examples of models which may be members of the neural networks category.

proof-of-concept platform (aka PoC platform): intended to include any platform for performing PoCs, typically in collaboration between at least one enterprise end-user of the platform, and at least one ISV (or vendor or startup) end-user of the platform. One example of a proof-of-concept platform or system is the proov.io PoC platform (aka Proov platform or Proov), or any system constructed and operative as described in the proov.io website, or any system described in any of the co-pending patent applications shown and described herein.

BRIEF DESCRIPTION OF THE DRAWINGS

Certain embodiments of the present invention are illustrated in the following drawings; all flowchart illustrations are for methods which may comprise any subset of or all of the illustrated operations, suitably ordered e.g. as shown:

FIG. 1 is a method, all or any subset of the operations of which, in any suitable order e.g. as shown, may be performed each time an enterprise end-user of a PoC platform opens a PoC and an ISV end-user joins this PoC.

FIG. 2 is a ML-model suitability assessment method all or any subset of the operations of which, in any suitable order e.g. as shown, may be performed.

Figure 3:
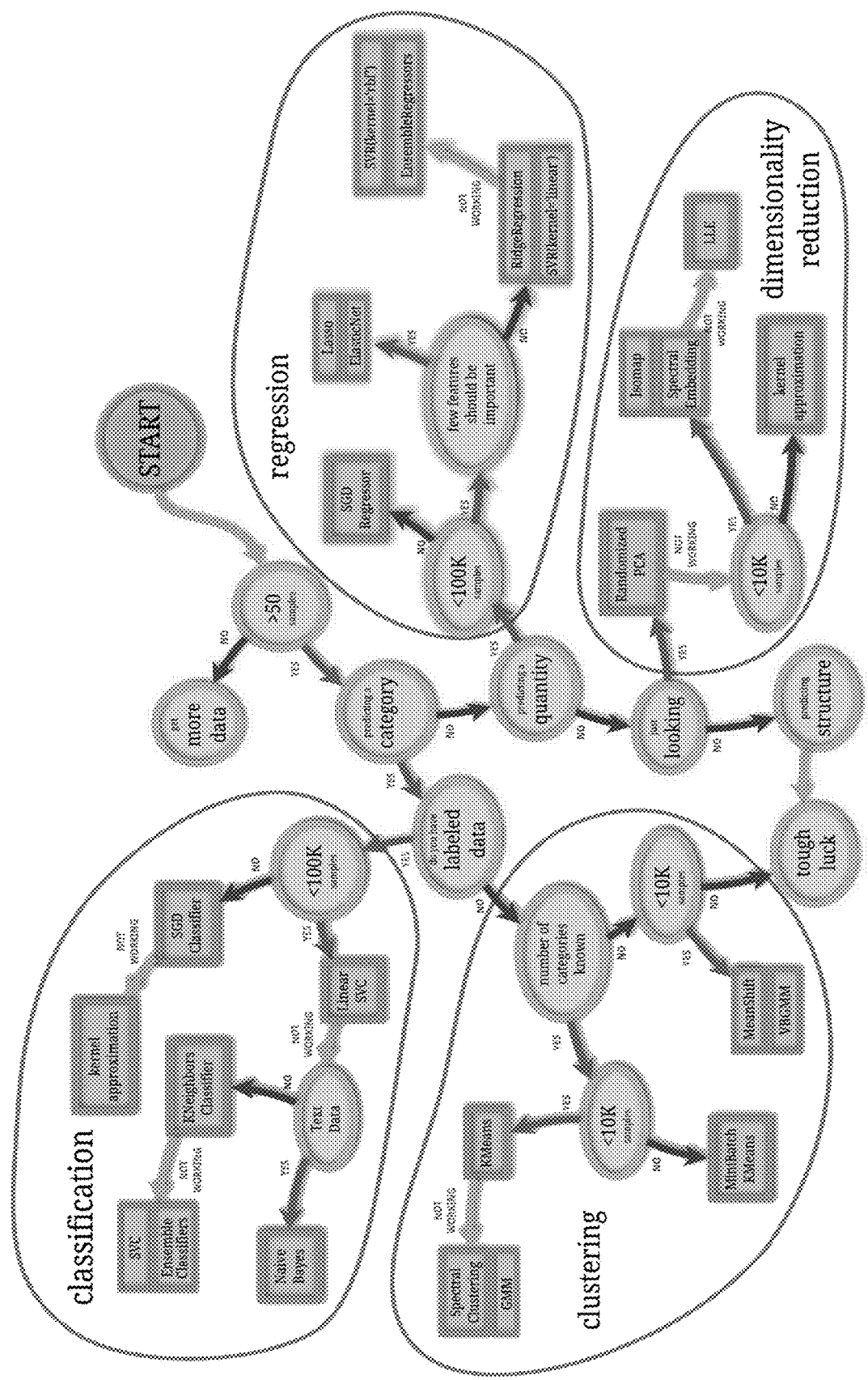
FIG. 3 is a prior art decision tree available on the web at the following link: scikit-learn.org/stable/tutorial/machine learning map/index.htML Methods and systems included in the scope of the present invention may include some (e.g. any suitable subset) or all of the functional blocks shown in the specifically illustrated implementations by way of example, in any suitable order e.g. as shown. Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs, and may originate from several computer files, which typically operate synergistically.

Each functionality or method herein may be implemented in software, firmware, hardware or any combination thereof. Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware, in which case some, or all of the variables, parameters and computations described herein, may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method. Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include an apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Many software products make intensive usage of Machine Learning (ML). However, conventional systems typically do not provide functionality to evaluate the ML model bundled with a given product. In the worst case, there could be a situation, when there is no ML in a startup's software product at all, contrary to what may be claimed by the startup. The system herein is configured to allow enterprises to compare efficiency of AI models used by ISVs or startups participating in each enterprise's pilots e.g. when using a PoC (proof of concept) evaluation platform aka PoC platform such as but not limited to the Proov platform or such as any system described on the Proov website or such as any system described in Proov's co-pending published patent applications (hereby incorporated by reference) e.g. those above-referenced.

The method of operation of the system of the present invention may include all or any subset of the following operations, suitably ordered e.g. as shown:

Operation 5: The PoC platform may pre-store a group of one or more test datasets for each category of model.

It is appreciated that datasets become available on many dataset websites constantly being updated, such as but not limited to:

catalog.data.gov/dataset
opendata.cityofnewyork.us/data/
www.kaggle.com/datasets Typically, plural datasets (texts, tables, images) are stored on the PoC platform, per category or industry (financial, medical, pharmaceutical etc.), where typically any small or large number of enterprises, startups and PoCs may relate to each category or industry.

According to certain embodiments, the structure identified in operation 40 of FIG. 1 is used to estimate the category to which the model belongs. For example, a PoC platform processor may read all information keyed in by a PoC platform's enterprise user to describe a PoC he is initiating (including some or all of the PoC's name, area of interest e.g. according to a taxonomy which may be presented to the enterprise end-user as one or more menu/s, instructions for ISV, goals of PoC, internal metadata of model), and determine whether the model is a classifier, neural net for prediction purposes, or other.

For every category, typically, the system pre-stores:
a group of datasets; typically when comparing competing models, results of running each model on each dataset in a group may be averaged over the group to yield an average result of running the model in question on data in that group, and/or snippets of code. Typically, each snippet of code computes a particular KPI such that when a model is evaluated on a dataset, this snippet may be used or called to compute this particular KPI that uses or inputs or analyzes or tests or evaluates model of this category, provided by startups and estimates the effectiveness of this model. An example Python code snippet, operative to measure ROC AUC, is the following:

```
# Cross Validation Classification ROC AUC
import pandas
from sklearn import model_selection
from sklearn.linear_model import LogisticRegression
url = "raw.githubusercontent.com/jbrownlee/Datasets/master/pima-indians-diabetes.data.csv"
    names = ['preg', 'plas', 'pres','skin', 'test', 'mass', 'pedi', 'age', 'class']
    dataframe = pandas.read_csv(url, names=names)
    array = dataframe.values
    X = array[:,0:8]
    Y = array[:,8]
    seed = 7
    kfold = model_selection.KFold(n_splits=10, random_state=seed)
    model = LogisticRegression( )
    scoring = 'roc_auc'
    results = model_selection.cross_val_score(model, X, Y, cv=kfold, scoring=scoring)
    print("AUC: %.3f (%.3f)") % (results.mean( ), results.std( ))
```

Model testing, e.g. by the pre-stored snippet of an ML-model-specific code, typically includes computing ML metrics specific to the category.

Example:

Metrics may include confusion matrix, accuracy or Classification Accuracy which may be weighted (cost-sensitive), precision, recall, f1 score, specificity, concordance, logarithmic_loss, Area under Curve, Mean Absolute Error, Mean Squared Error, Lift, Break Even Point, ROC/ROC Area.

ML metrics for a certain category may include only those metrics which are sensitive to unbalanced classes such as precision/recall, F-score, PR AUC whereas ML metrics for another category may include only metrics which are insensitive to unbalanced classes such as ROC AUC.

The problems of classification and regression (forecasting aka prediction), for example, may each have different ML metrics, since at least some metrics suitable for one of these problems is not suitable for the other, and vice versa.

For example, a PoC platform may store the following ML metrics or KPIs as being suitable for characterizing quality of classification ML models: Classification Accuracy, Logarithmic Loss, Area Under ROC Curve, Confusion Matrix, Classification Report, and may store the following ML metrics or KPIs as being suitable for characterizing quality of prediction ML models:

Mean Absolute Error, Mean Squared Error, R^2.

Operation 10. During definition of a specific pilot or PoC e.g. on a PoC platform, the enterprise may indicate, e.g. via the proof of concept platform's user interface, a request to evaluate AI Model/s provided by startup/s participating in a given pilot Operation 25. Upon joining that PoC or pilot, the (or each) startup/ISV may receive a "request" to provide access to its AI Model Each Startup/ISV may load a Model (e.g. data indicative of neural net layers in the model) and/or its weights, typically per layer.

A model file may for example include all or any subset of the following information regarding a model:
    the architecture of the model, enabling re-creation thereof
    the weights of the model
    training configuration (loss, optimizer)
    state of the optimizer, allowing to resume training exactly where training last left off.

For example, a PoC platform's UI, operative to register or enroll an ISV (aka startup or vendor) end-user for a PoC, may prompt the ISV to indicate that its model is one of various categories in a category menu presented to the ISV; the menu of categories may include, say: artificial neural network, support vector machine, linear regression or logistic regression, etc. The UI may prompt the ISV to indicate the parameters which define a model in the selected category. For example, the UI may prompt the ISV to indicate the number of levels or layers in the model, and the weights used by each layer, if the ISV indicates that the model is an artificial neural network. The UI may prompt the ISV to indicate the support vectors used by the model, if the ISV indicates that the model is a support vector machine. The UI may prompt the ISV to indicate the regression coefficients used by the model, if the ISV indicates that the model is a linear regression or logistic regression model, and so forth.

Operation 40. The system, e.g. PoC platform, may identify the structure of the model e.g. all or any subset of: structural parameters such as: an indication of the number of layers in the model, activation functions used in these layers, number of input features in the model.

Structure identification may employ code reflection techniques (e.g., typically, loading the model and its weights into an appropriate Python class. Then, accessing methods of this class make it possible to try to identify the structure of this model—and/or to analyze the model's code text as uploaded by the startup in operation 30.

According to certain embodiments, a processor in the system e.g. PoC platform may identify the extensions of the model's files (e.g. .caffe or .h5). Next, based on the extensions, the processor may attempt to load this model with stored frameworks e.g. as described herein, support this model's files. Once this has been done successfully, using framework x, the processor may attempt to deduce the class and category of the model, as well its weights, activation functions, etc., given that the framework is x.

Alternatively, or in addition, the system's user interface requests structural information from the system's (e.g. PoC platform's) startup end-user (e.g. asks, vis a suitable user interface, how many levels the startup's neural network has).

It is appreciated that the structure of the model as provided in operation 40 may be advantageous in deriving the category of the model e.g. as described herein with reference to operation 50.

An output may be generated in which a given model's structure is presented e.g. displayed to an end user of the PoC platform e.g. the enterprise and/or startup end users associated with the PoC within which the software product that incorporates the given model, is contending along with other startups' (other ISV user entities) software products.

Operation 50. The system may identify the "category" of the model (alternatively, or in addition, the system's user interface requests this information from the startup). This is advantageous because if the system (its processors or logic) derive from the structure of a model that the model is a classifier, then only those evaluation techniques that are relevant for classifiers, rather than predictors, may be applied (e.g. only KPIs relevant for classifiers, and not those KPIs relevant for predictors, may be computed).

Example:

The following is a model file for Keras with Theano backend

```
{
    "keras_version":"2.0.2",
    "backend":"theano",
    "config":[
        {
            "config":{
                "dtype":"float32",
                "bias_regularizer":null,
                "activation":"relu",
                "bias_constraint":null,
```

```
        "use_bias":true,
        "bias_initializer":{
            "config":{
            },
            "class_name":"Zeros"
        },
        "kernel_regularizer":null,
        "activity_regularizer":null,
        "kernel_constraint":null,
        "trainable":true,
        "name":"dense_1",
        "kernel_initializer":{
            "config":{
                "maxval":0.05,
                "minval":-0.05,
                "seed":null
            },
            "class_name":"RandomUniform"
        },
        "batch_input_shape":[
            null,
            8
        ],
        "units":12
    },
    "class_name":"Dense"
},
{
    "config":{
        "kernel_regularizer":null,
        "bias_regularizer":null,
        "activation":"relu",
        "bias_constraint":null,
        "use_bias":true,
        "bias_initializer":{
            "config":{
            },
            "class_name":"Zeros"
        },
        "activity_regularizer":null,
        "kernel_constraint":null,
        "trainable":true,
        "name":"dense_2",
        "kernel_initializer":{
            "config":{
                "maxval":0.05,
                "minval":-0.05,
                "seed":null
            },
            "class_name":"RandomUniform"
        },
        "units":8
    },
    "class_name":"Dense"
},
{
    "config":{
        "kernel_regularizer":null,
        "bias_regularizer":null,
        "activation":"sigmoid",
        "bias_constraint":null,
        "use_bias":true,
        "bias_initializer":{
            "config":{
            },
            "class_name":"Zeros"
        },
        "activity_regularizer":null,
        "kernel_constraint":null,
        "trainable":true,
        "name":"dense_3",
        "kernel_initializer":{
            "config":{
                "maxval":0.05,
                "minval":-0.05,
                "seed":null
            },
            "class_name":"RandomUniform"
        },
        "units":1
    },
    "class_name":"Dense"
}
],
"class_name":" Sequential"
}
no
```

Given the above format for the model file stored in Keras, the Model category is Sequential, which indicates a Deep Neural Network with three layers (Dense). Also, for the first two layers the activation function is RELU, whereas for the last layer the activation function is SIGMOID. Also, since this is a sequential model, the PoC platform may assume that the model is applicable for classification. Thus, typically, the model may be applied e.g. by the PoC platform's processor, to datasets pre-stored on the platform which are indicated as classification model evaluation datasets, thereby to evaluate this model, and code snippets which compute metrics that measure effectiveness or correctness of classification models may be called, e.g. by the PoC platform's processor's logic.

Operation 60. The system may select test dataset/s, from among those pre-stored in Operation 5, based on the category identified in operation 50.

Operation 70. The system may test each model of each startup participating in the specific pilot, on every dataset in the group selected in operation 60, e.g. by running the snippet of code pre-stored for a model of the category identified in operation 50.

Operation 80: the system e.g. PoC platform, typically in parallel to operation 70, may measure the efficiency of the model and/or software product implementing the model in terms of its memory consumption, CPU consumption, or any other suitable KPIs etc., e.g. as described in the above-referenced co-pending patent documents.

The PoC platform may use KPIs (aka ML metrics) such as all or any subset of the following:
confusion matrix
prescision/recall, f-score
pr auc
roc auc—
sensitivity to unbalanced classes
Pearson correlation coefficient (Pcc)
r-squared
standard deviation, mean, median of errors 2(related to input datasets)
sensitivity to noise (related to input datasets)
sensitivity to outliers (related to input datasets)
sensitivity to time gaps,
thereby to facilitate comparison between models.

Measurements are typically time-based. Typically, in parallel to computing ML metrics as described above, the PoC platform also measures KPIs relevant to software performance, such as the software solution's CPU usage or memory usage. Thus, two models participating in a PoC which both "scored" equally in terms of ML metrics, may differ in terms of CPU usage, allowing one of the two models to be selected over the other, by the enterprise running the PoC.

According to certain embodiments, the identity of the ISV/software solution/model that is human-selected post-PoC by the CTO of the enterprise end-user, may, if this selection is reported to the PoC platform, be used by the PoC platform to machine-learn how to weight various metrics for the various categories. For example, if software product x whose ML-model is in category a, scored high on metric 1, but low on metric 2, whereas software product y whose ML-model is also in category a scored high on metric 2, but low on metric 1, and software product x out-performed y, in terms of being selected over software product y, post-PoC, e.g. by the CTO of the enterprise end-user, that might indicate that metric 1's weighting as stored by the PoC platform should be increased relative to metric 2 for category a, whereas if y outperformed x in the same manner, that might indicate that for category a, metric 2's weighting should be increased relative to metric 1.

It is appreciated that in some cases, there is no ML in a product at all—in which case this will become apparent when the startup does not provide any model, and the system, e.g. PoC platform, typically refrains from qualifying (e.g. generating metrics for) the model that does not exist from the system's point of view.

Typically, the system or platform stores dictionaries, typically categorized, say, by industry (e.g. medical, financial, pharmaceutical and other), such as, in the medical field, a dictionary of symptoms in which each entry is a string (e.g. alphanumeric) describing a symptom, a dictionary of diseases in which each entry is a string, such as "diabetes", describing a disease, a dictionary of medications in which each entry is a string, such as "aspirin" or "Seroquel", describing a medication, etc.

When new datasets in table form are acquired, software should be run on each column of each table to identify the dictionary whose entries appear most in that column; then the identity of that column of this table is deduced. For example, if the entries in table 1's first column most closely resemble the symptoms dictionary, one may assume that table 1's first column contains "symptoms".

Alternatively or in addition, some datasets in table form, which are open or purchased, may have already-tagged columns.

Typically, the system or platform stores a multiplicity (e.g. thousands or millions or more) of datasets, which may be accumulated by human engineers routinely e.g. periodically or via a subscription, e.g. from dataset websites such as Google Public Datasets, UCI Machine Learning Repository, Data.gov etc. (platform engineers may purchase or upload to the platform only datasets which correspond to the categories defined by a threshold percentage of platform end-users to date) and/or may be accumulated for a particular proof of concept.

The platform may use the same "taxonomy" (categories or "industries", and subcategories below the categories), or different taxonomies, to categorize PoCs (e.g. to present in menu form to an enterprise engineer categorizing a given PoC) and to categorize datasets and to categorize dictionaries. For example, the platform may present industry menus (and, after an industry is selected, subcategory menus "under" that industry) which allow enterprise engineers who are opening a PoC to categorize their PoC, and these menus may include entries used by dataset websites to categorize their datasets, thereby to provide compatibility.

The platform typically stores lists of KPIs which are suitable for evaluating models of various categories.

Alternatively or in addition, the platform stores lists of "general" KPIs which are suitable for evaluating any software, regardless of the model embodied therewithin, such as the amount of memory or CPU required.

The platform typically stores code snippets which are respectively suitable for computing various KPIs such as the above model evaluation KPIs and/or "general" KPIs. Thus, for a given PoC, to which n ISV end-users have registered, the platform may run n bodies of code uploaded by each of n ISV end-users on each of various datasets, provided by the platform and/or by the enterprise, and may compute model evaluation KPIs and/or "general KPIs each time a body of code is run on a dataset, thereby to yield various KPIs for various runs of various bodies of codes on various datasets. The enterprise's engineer may define that only one or a few of the available KPIs are of interest to the enterprise, and may choose to see measures of central tendency (e.g. median/mode/mean) computed over the available datasets, thereby to obtain means (say), for one or just a few KPIs, for each ISV, thereby to greatly facilitate selection of a single ISV from among the participants in the proof of concept.

When a given PoC is opened by an enterprise in a particular industry and ISV end-users register for the PoC, the system may automatically identify datasets for that industry which may be used for this PoC ML model evaluation. Datasets having columns which match the PoC's goal (which may be, say "a system which IDs patients at high risk of diabetes", or may be, say, "binary classifier to sort medical case study summaries into 2 groups—cancer patients and other") or "match" each of the independent variables of the PoC, and then runs the software uploaded by each ISV on these datasets.

Any suitable method, such as the method of FIG. 2, may be employed to evaluate or assess suitability of each ISV's model, for a given PoC. The method of FIG. 2 may include all or any subset of the following operations, suitably ordered e.g. as shown.

Operation 100. The platform typically provides a PoC-defining user interface. It is appreciated that the term user interface or "UI" as used herein includes also the underlying logic which controls the data presented to the user e.g. by the system display and receives and processes data entered by the user e.g. using her or his workstation.

While using the PoC-defining user interface, aka PoC wizard, the enterprise may be prompted to tag the PoC e.g. by selecting one of a multiplicity of platform tags, such as, say "data mining", "fintech", "saas", "banking", "it management", "predictive analytics", "blockchain", "decision support system", etc. All or a subset of the platform tags may have, in the platform, a stored association with one or more model categories which are suitable for PoC's bearing that tag. For example:

If a PoC is tagged as being/involving predictive analytics=>time series prediction, regression may be stored as model category which are suitable for PoC's bearing that tag.

If a PoC is tagged as being/involving data mining=>classification, categorization may be stored as model category suitable for PoC's bearing that tag.

If a PoC is tagged as being/involving abnormal behaviour=>categorization may be stored as model category suitable for PoC's bearing that tag.

If a PoC is tagged as being/involving fraud detection=>categorization, classification may be stored as model category suitable for PoC's bearing that tag.

If a PoC is tagged as being/involving medical imaging=>pattern/image recognition, image classification may be stored as model category suitable for PoC's bearing that tag.

If a PoC is tagged as being/involving computer vision=>image recognition, object detection, face detection may be stored as model category suitable for PoC's bearing that tag.

If a PoC is tagged as being/involving incident response=>classification, categorization may be stored as model category suitable for PoC's bearing that tag.

If a PoC is tagged as being/involving text classification=>classification, categorization may be stored as model category suitable for PoC's bearing that tag.

If only a subset of platform tags have a stored association with one or more model categories, then according to some embodiments, the enterprise end-user is required to select at least one or exactly one tag, characterizing his PoC, from this subset.

Alternatively or in addition, natural language description of the PoC, as provided by the enterprise end-user via the wizard, may be tagged automatically rather than by the enterprise end-user and/or a best-matching one of the above-described subset of platform tags may be selected automatically by the platform. It is appreciated that automatic generation of tags from text is known, e.g. as described here: clgiles.ist.psu.edu/pubs/TWEB2011-tagging.pdf Open source tools for auto-generating tags for content are known, e.g. Tagger and Topia's Term Extractor.

If the tags selected above have a stored association with one or more model categories which are suitable for PoCs bearing that tag, those model categories as being suitable for this PoC, are selected.

The method also typically selects datasets for the PoC that are associated, in platform memory, with the selected model category/ies.

200. An ISV which has joined the PoC, uploads its model files.

It is appreciated that when an ISV joins a PoC, a suitable UI provided by the platform may prompt the ISV/startup to upload file/s describing the model, such as, in certain frameworks, a "model file" and/or "model params file". It is appreciated that some frameworks store all data describing each model in a single file, termed a "model file" in some frameworks, and other frameworks store this data in plural files. Generally, a model, once generated or trained, may be saved in "model file/s". For example, Apache MXNet is an open-source deep learning framework used to train, and deploy models e.g. deep neural networks. It supports multiple languages (C++, Python, Julia, Clojure, JavaScript, R, Scala).

A data scientist can train models using Python, and save the models in "model files" which can be loaded for use in production for inference e.g. using Java APIs. For example, a Keras "model file" is generated by training a model then saving the trained model, using the "model.save" command.

Model files may include a symbol file, params (parameters) file and synset.txt file. Typically, the symbol file stores a description of the model's architecture (the layers used in the model).

The params file stores trained model weights assigned to the layers. The synset file stores class labels used in training.

print(model0.summary( )) is a keras command that provides a summary of a model's structure including the number of parameters.

Typically, the platform server validates that all files uploaded by the ISV are valid e.g. using provided checksums.

Operation 220 the platform's server tries to load and read the uploaded file using any one of whichever Deep learning Libraries/Frameworks (such as all or any subset of Keras, TensorFlow, Torch, CNTK, Mahout) are supported by the PoC platform. In case of failure to load and read—the server may report that this file format is not supported.

Operation 230. assuming success in reading the uploaded file mode, the platform server may identify the model category/structure (e.g. number of layers in the model) using suitable tools from the framework that have successfully read the model. For example, in Keras, suitable tool/s for this purpose are described in this link: machinelearningmastery.com/save-load-keras-deep-learning-models/.

Operation 240. If the model as identified by the framework's tools is not any of the model categories selected above as being suitable for this PoC, an output indication is provided to the enterprise end-user indicating that this particular ISV appears to be using a model which is not suitable for the PoC.

Operation 250. Test datasets are run on the model (e.g. test datasets which are suitable for the model category as identified by the framework's tools and/or data sets suitable for the model category/ies known to be suitable for the PoC) and KPIs are computed which are relevant to the model category identified by the framework's tools and/or KPIs suitable for the model category/ies known to be suitable for the PoC. A Mean (or other central tendency) may be computed for each KPI, over all datasets on which a given ISV's software is run. The KPIs and/or their means are displayed to the enterprise end-user running the PoC (proof of concept).

Operation 300. Repeat operations 200, 220, 230, 240, 250 for each ISV that joins the PoC.

According to certain embodiments, the above method operative to evaluate or assess suitability of ISV's model/s, for PoCs, has learning capability. The learning capability may be operative to improve and/or add to existing ISV model suitability rules and use existing PoC results to learn how to better evaluate whether a model is suitable yes/no (e.g. in a certain PoC, enterprise chose startup 3 and rejected the remaining 4 startups that registered; this suggests that the model favored by startup3 is, in the eyes of the enterprise running the PoC, suitable for this PoC, and hence the model's category should perhaps be associated with all or some of the tags associated with this PoC.

For example, if a given ISV S participating in a given PoC (e.g. an ISV S regarding which an "unsuitable model" indication was provided in operation 240 above) is nonetheless selected by the enterprise end-user which opened or defined the PoC, from among various other participants in a given PoC, then all or some tags in the set S of tags associated with that PoC may be associated in memory with the model category incorporated in the software of ISV S. This may occur if just one ISV presenting a model of the given model category is selected for a respective PoC having a given tag. Or, this may occur only when a predetermined number N<1 of ISV's each presenting a model of the same given model category are each in turn selected for a respective PoC having the given tag. Example: it is known to a PoC platform, that a category C PoC or PoC goals are best served by model categories x and y. In addition, in order to evaluate models for this category the PoC platform knows that datasets d1 and d2 stored on the platform are suitable. PoC platform's Enterprise end-user E creates a PoC with category X (as indicated e.g. by a suitable tag selected by E). Next, ISV V joins the PoC and uploads its model's files. The PoC platform's logic identifies that this model z does not serve category X. The platform's logic may optionally ask an Enterprise to approve model evaluation given this is the case. Assuming Enterprise decides to proceed with model z anyway, and assuming that when this model is run on datasets d1 and d2 the resulting metrics exceed some pre-defined level of goodness, the PoC platform's logic may then decide that model z, like models of categories x and y, does serve category C.

It is appreciated that the above method is merely an example of a model suitability assessment method. Alternatively or in addition, any suitable rules may be provided to allow model suitability decisions (e.g. classifier model is suitable for SVM, etc.) to be made e.g. based on some or all portions of the decision-tree shown in FIG. 3 (with all arrows reversed) which is a prior art decision tree available on the web at the following link: scikit-learn.org/stable/tutorial/machine learning map/index.htML.

According to certain embodiments, names of model categories, such as "support vector machine", or alphanumeric strings clearly suggestive of model categories e.g. "text classification" (suggestive that classifier-type models are suitable whereas clustering-type models or regression-type models or dimensionality reduction type models, are unsuitable) may be used as PoC tags thereby to easily allow PoCs which are tagged with these tags to be associated with a desired or suitable model category. According to certain embodiments, a table may be provided, stating which of the 4 groups of model categories (say: classifiers, clustering, regression or prediction, dimension reduction) are suitable or unsuitable for each of various tags. According to certain embodiments, the enterprise end-user may be required to select at least one tag that is directly relevant to model-suitability assessment (e.g. at least one tag which is a subject of at least one existing model-suitability assessment rule).

According to certain embodiments, the server has natural-text analysis capability, operative to perform semantic analysis of free-text or natural language fields in the PoC wizard (such as PoC description, PoC goals, instructions, and the actual contents of attachments that the user interface may allow the enterprise to upload in the PoC-defining UI, aka wizard, between the enterprise end-users and the platform).

It is appreciated that any suitable set of model categories may be supported by the platform. For example, model categories supported by the platform for Time Series Forecasting may include all or any subset of the following:

1. Autoregression (AR)
2. Moving Average (MA)
3. Autoregressive Moving Average (ARMA)
4. Autoregressive Integrated Moving Average (ARIMA)
5. Seasonal Autoregressive Integrated Moving-Average (SARIMA)
6. Seasonal Autoregressive Integrated Moving-Average with Exogenous Regressors (SARIMAX)
7. Vector Autoregression (VAR)
8. Vector Autoregression Moving-Average (VARMA)
9. Vector Autoregression Moving-Average with Exogenous Regressors (VARMAX)
10. Simple Exponential Smoothing (SES)
11. Holt Winter's Exponential Smoothing (HWES) Model categories supported by the platform for Classification may include all or any subset of the following:
1. Naive Bayes
2. SVM
3. KNN—k-nearest neighbors
4. GMM—Gaussian Mixture Models
Model categories supported by the platform for clustering may include all or any subset of the following:
1. k-Means
2. Affinity propagation
3. Mean shift
4. Hierarchical clustering
5. Birch It is appreciated that the same PoC-characterizing tags, which may be defined by the enterprise which initiates the PoC, may be used for model-suitability assessment and for selecting datasets, from a library of data sets, which are suitable for the PoC.

An advantage of embodiments herein is that an enterprise is aided in selecting one of several software solutions provided by respective ISVs participating in a PoC, on the basis of what really counts, namely not model attributes of the machine learning model embodied in each software solution but, instead, rather what output each software solution with its embodied model is capable of producing, given typical inputs. This may be done according to certain embodiments by running all models on the same test data samples. Alternatively or in addition, metrics may be used to evaluate these models e.g. assess their suitability e.g. as described herein.

An advantage of certain embodiments is that the ML model may be tested irrespective of matter what the PoC is about, and/or irrespective of the production environment in which the software solution selected in the PoC is intended to run.

Any process, operation, feature or embodiment described herein may be provided in conjunction with any PoC platform having any combination of the various features and variations described in the above-referenced published co-owned patent documents (hereby incorporated by reference) which describe a PoC platform and technologies useful in conjunction therewith.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones, may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if -then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true, and never by determinations that x is false.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment, or in a certain order, may be provided separately or in any suitable sub-combination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A proof-of-concept (PoC) system comprising: a networked platform, serving a population of enterprise end-users and a population of independent software vendor (ISV) end-users, on which PoCs are run, the platform including a PoC-defining user interface via which at least one enterprise end-user generates a definition of at least one PoC, wherein the definition of the at least one PoC comprises an indication of a request to evaluate an artificial intelligence (AI) model provided by a startup participating in a pilot; a processor including logic configured to automatically assess whether an individual machine learning (ML) model embodied in a body of code of an individual software product registered for an individual PoC is suitable for the individual PoC as defined by said definition of the at least one PoC, wherein the system includes a memory and wherein tags define at least one PoC and wherein at least some of the tags are associated in said memory with a respective set of ML models including at least one category of ML model and wherein the processor determines the category of said individual ML model and then assesses that the individual ML model is suitable for the individual PoC if the category of said individual ML model is included in said set of ML models and wherein the system also comprises an ISV user interface via which at least one ISV end-user registers at least one software product for at least one PoC defined by at least one enterprise end-user; and wherein the user interface prompts an individual ISV end-user to generate a definition of the individual ML model embodied in the individual software product registered for the individual PoC by the individual ISV end-user, wherein the individual ML model is of a particular category and wherein the processor derives said particular category from said definition of the individual ML model and assesses that the individual ML model is suitable for the individual PoC if said particular category is included in said set of ML models.

2. A system according to claim 1 wherein said tags are selected, by the enterprise end-user via the PoC-defining user interface, from a plurality of tags stored in said memory and presented to the enterprise end-user.

3. A system according to claim 1 wherein for at least one PoC for which at least one software product has registered, a KPI is computed which represents the software product's extent of usage of at least one of memory and CPU.

4. A system according to claim 1 wherein for software products with different categories of ML models, the platform computes different ML model quality KPIs respectively, using stored data indicating ML KPIs which are suitable for each of plural categories of ML models.

5. A system according to claim 4 wherein said ML model quality KPIs are computed by code snippets that are stored by the platform and wherein at least one of said code snippets is re-used plural times, to compute model quality for each of m>1 models participating in each of p>1 PoCs.

6. A system according to claim 1 wherein the platform stores datasets suitable for a certain category of models which are re-run on each of m>1 models of said category participating in each of p>1 PoCs.

7. A system according to claim 6 wherein the platform stores dictionaries of instances of semantic categories and uses said dictionaries to identify table columns in newly arrived datasets.

8. A system according to claim 6 wherein the PoC-defining user interface provides at least one enterprise end-user with a hierarchical menu having at least one layer, and wherein the enterprise end-user classifies the PoC according to a taxonomy underlying the hierarchical menu and wherein the same taxonomy is used to add dataset metadata to each of said datasets, said dataset metadata classifying each of said datasets according to said taxonomy.

9. A system according to claim 8 wherein the same taxonomy is used to add dictionary metadata to each of said dictionaries, said dictionary metadata classifying each of said dictionaries according to said taxonomy.

10. A proof-of-concept (PoC) method comprising: on a networked platform, serving a population of enterprise end-users and a population of independent software vendor (ISV) end-users, on which PoCs are run, providing a PoC-defining user interface via which at least one enterprise end-user generates a definition of at least one PoC, wherein the definition of the at least one PoC comprises an indication of a request to evaluate an artificial intelligence (AI) model provided by a startup participating in a pilot; and using a processor to automatically assess whether an individual machine learning model embodied in a body of code of an individual software product registered for an individual PoC, is suitable for the individual PoC as defined by said definition of the at least one PoC, wherein the system includes a memory and wherein tags define at least one PoC and wherein at least some of the tags are associated in said memory with a respective set of ML models including at least one category of ML model and wherein the processor determines the category of said individual ML model and then assesses that the individual ML model is suitable for the individual PoC if the category of said individual ML model is included in said set of ML models and wherein the system also comprises an ISV user interface via which at least one ISV end-user registers at least one software product for at least one PoC defined by at least one enterprise end-user; and wherein the user interface prompts an individual ISV end-user to generate a definition of the individual ML model embodied in the individual software product registered for the individual PoC by the individual ISV end-user, wherein the individual ML model is of a particular category and wherein the processor derives said particular category from said definition of the individual ML model and assesses that the individual ML model is suitable for the individual PoC if said particular category is included in said set of ML models.

11. A computer program product, comprising a non-transitory tangible computer readable medium having computer readable program code embodied therein, said computer readable program code adapted to be executed to implement a proof-of-concept (PoC) method comprising: on a networked platform, serving a population of enterprise end-users and a population of independent software vendor (ISV) end-users, on which PoCs are run, providing a PoC-defining user interface via which at least one enterprise end-user generates a definition of at least one PoC, wherein the definition of the at least one PoC comprises an indication of a request to evaluate an artificial intelligence (AI) model provided by a startup participating in a pilot; and using a processor to automatically assess whether an individual machine learning model embodied in a body of code of an individual software product registered for an individual PoC, is suitable for the individual PoC as defined by said definition of the at least one PoC, wherein the processor is coupled with a memory and wherein tags define at least one PoC and wherein at least some of the tags are associated in said memory with a respective set of ML models including at least one category of ML model and wherein the processor determines the category of said individual ML model and then assesses that the individual ML model is suitable for the individual PoC if the category of said individual ML model is included in said set of ML models and wherein the system also comprises an ISV user interface via which at least one ISV end-user registers at least one software product for at least one PoC defined by at least one enterprise end-user; and wherein the user interface prompts an individual ISV end-user to generate a definition of the individual ML model embodied in the individual software product registered for the individual PoC by the individual ISV end-user, wherein the individual ML model is of a particular category and wherein the processor derives said particular category from said definition of the individual ML model and assesses that the individual ML model is suitable for the individual PoC if said particular category is included in said set of ML models.

* * * * *